(12) United States Patent
Hoogerbrugge et al.

(10) Patent No.: US 12,462,071 B2
(45) Date of Patent: Nov. 4, 2025

(54) METHOD FOR PROTECTING A MACHINE LEARNING MODEL FROM A SIDE CHANNEL ATTACK

(71) Applicant: NXP B.V., Eindhoven (NL)

(72) Inventors: Jan Hoogerbrugge, Helmond (NL); Wilhelmus Petrus Adrianus Johannus Michiels, Reusel (NL)

(73) Assignee: NXP B.V., Eindhoven (NL)

( * ) Notice: Subject to any disclaimer, the term of this patent is extended or adjusted under 35 U.S.C. 154(b) by 364 days.

(21) Appl. No.: 18/046,547

(22) Filed: Oct. 14, 2022

(65) Prior Publication Data
US 2024/0126931 A1 Apr. 18, 2024

(51) Int. Cl.
G06F 21/75 (2013.01)
G06N 3/048 (2023.01)

(52) U.S. Cl.
CPC .............. *G06F 21/75* (2013.01); *G06N 3/048* (2023.01)

(58) Field of Classification Search
CPC ................................ G06F 21/75; G06N 3/048
See application file for complete search history.

(56) References Cited

U.S. PATENT DOCUMENTS

2020/0349047 A1* 11/2020 Faibish ................. G06N 3/08
2023/0237374 A1* 7/2023 Lee ..................... G06N 3/048
706/12
2024/0029135 A1* 1/2024 Katz ................. G06Q 30/0631
2024/0135153 A1* 4/2024 Csefalvay .............. G06N 3/048
2024/0220627 A1* 7/2024 Jeong .................... G06F 21/577

FOREIGN PATENT DOCUMENTS

CN 111597551 A 8/2020
CN 109918951 B 9/2020

OTHER PUBLICATIONS

Batina, Lejla et al.; "CSI NN: Reverse Engineering of Neural Network Architectures Through Electromagnetic Side Channel"; 28th USENIX Security Symposium (USENIX Security 19), Aug. 14-16, 2019, Santa Clara CA.
Brosch, Manuel et al.; "Counteract Side-Channel Analysis of Neural Networks by Shuffling"; 2022 Design, Automation & Test in Europe Conference & Exhibition (Date); Mar. 14-23, 2022, Antwerp, Belgium; https://doi.org/10.23919/DATE54114.2022.9774710.
(Continued)

*Primary Examiner* — Ryan J Jakovac

(57) ABSTRACT

A method is provided for protecting a machine learning (ML) model from a side channel attack (SCA). A permutation is performed of weights and biases for a first layer of the ML model. The permutated weights and biases of the first layer are scaled using a scaling factor greater than zero to generate scaled and permutated weights and biases for a first plurality of nodes of the first layer. The weights for a second layer immediately following the first layer are modified to compensate for the permutation and scaling of the weights and biases of the first layer. The modified weights and biases of the first and second layers are substituted for corresponding original weights and biases of the ML model. An inference engine of the ML model is executed using the modified weights and biases of the first and second layers for an inference operation.

20 Claims, 6 Drawing Sheets

(56) References Cited

OTHER PUBLICATIONS

De Meyer, Lauren et al.; "Multiplicative Masking for AES in Hardware"; IACR Transactions on Cryptographic Hardware and Embedded Systems; Sep. 9-12, 2018, Amsterdam, The Netherlands; https://doi.org/10.13154/tches.v2018.i3.431-468.
Dubey, Anuj et al.; "BoMaNet: Boolean Masking of an Entire Neural Network"; ICCAD '20: Proceedings of the 39th International Conference on Computer-Aided Design; Nov. 2-5, 2020; DOI:10.1145/3400302.3415649.
Dubey, Anuj et al.; "ModuloNET: Neural Networks Meet Modular Arithmetic for Efficient Hardware Masking"; IACR Transactions on Cryptographic Hardware and Embedded Systems; Sep. 18-21, 2022, Leuven, Belgium; doi.org/10.46586/tches.v2022.i1.506-556 (2022).
Hua, Weizhe et al.; "Reverse Engineering Convolutional Neural Networks Through Side-channel Information Leaks"; DAC '18: Proceedings of the 55th Annual Design Automation Conference, Jun. 24-29, 2018, San Francisco, CA; https://doi.org/10.1145/3195970.3196105.
Mangard, Stefan et al.; "Power Analysis Attacks: Revealing the Secrets of Smart Cards"; Section 7.3.1, pp. 176-194; Springer-Verlag US 2007.
U.S. Appl. No. 17/810,424, filed Jul. 1, 2022; "Method for Protecting a Machine Learning Model From a Side Channel Attack"; Inventor: Jan Hoogerbrugge et al.
U.S. Appl. No. 17/810,428, filed Jul. 1, 2022; "Method for Protecting a Machine Learning Model From a Side Channel Attack"; Inventor: Hoogerbrugge et al.

\* cited by examiner

METHOD FOR PROTECTING A MACHINE LEARNING MODEL FROM A SIDE CHANNEL ATTACK

BACKGROUND

Field

This disclosure relates generally to machine learning (ML), and more particularly, to a method for protecting a ML model from a side channel attack (SCA).

Related Art

Machine learning models are frequently implemented in electronic devices used in systems like automotive radar and optical systems. Protecting a ML model implemented in such a system from theft or copying has become a problem. There are various methods used to steal or copy an ML model. One relatively new technique used to steal a ML model from a device uses a side channel attack (SCA) on power consumption or electromagnetic emissions. Once an attacker has copied the model, it can be illegitimately used and monetized.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
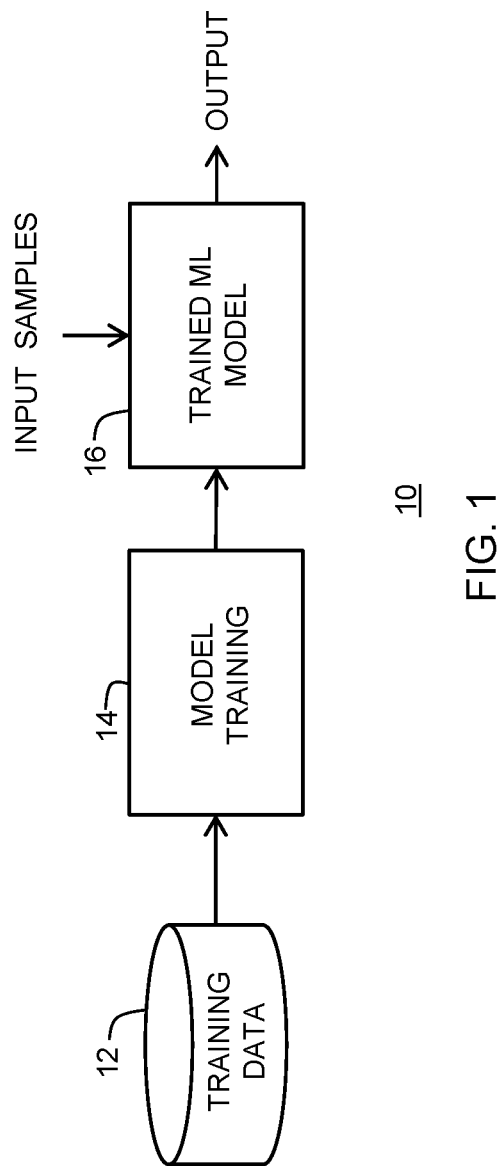
FIG. 1 illustrates a system for training and using a ML model.

Generally, there is provided, a method for protecting an ML model from a SCA. The ML model includes a network, such as a neural network, having layers of nodes connected from a first layer to a last layer. Some or all the connections between the nodes are weighted and biased. A basic computation of a network during an inference run, or operation, produces a weighted sum of the weights, biases, and activation functions. In one embodiment, a countermeasure is provided against a SCA involving modifying the weights and biases of at least the first two layers of the ML network prior to an inference run. The modification of the weights and biases of the first layer includes randomly permutating and scaling the weights and biases. The modifications of the weights and biases of the first layer are compensated for by modifications of the weights in a second layer immediately following the first layer. The modified weights and biases of the first and second layers substitute for the corresponding original weights and biases in the machine learning model. An inference engine of the ML model is run with the modified weights and biases. The weights and biases may be randomly scaled and permutated prior to each execution of the inference engine, or prior to every nth execution of the inference engine. This countermeasure against a SCA provides an advantage that an inference engine of the ML network does not have to be modified to provide the SCA protection.

In accordance with an embodiment, there is provided, a method for protecting a machine learning (ML) model from a side channel attack (SCA), the method executed by a processor in a data processing system, the method including: generating a permutation of weights and biases for a first layer of the ML model; scaling the permutated weights and biases of the first layer using a scaling factor greater than zero to generate scaled and permutated weights and biases for a first plurality of nodes of the first layer; modifying the weights for a second layer immediately following the first layer, wherein the weights are modified to compensate for the permutation and scaling of the weights and biases of the first layer; and executing an inference engine for an inference operation of the ML model using the scaled and permutated weights and biases of the first layer and the modified weights of the second layer for the inference operation. The first layer may be a first layer of a neural network of the ML model and the second layer may be a second layer of the neural network immediately following the first layer. Executing the inference engine of the ML model may further include, for a node of the first layer, computing a first weighted sum for every output value of the node of the first layer using the permutated and scaled weight corresponding to the node of the first layer with an input value to the first layer to which the permutated and scaled biases are added. The method may further include applying an activation function to the scaled and permutated weights and biases of the first layer, and to the modified weights of the second layer. The activation function may be a rectified linear unit (RELU) activation function. The method may be performed or controlled using application programming interface (API) code in an application of the data processing system. The scaling factor is randomly generated. The permutation may be a random permutation. The input may be an image to be classified by the ML model. The weights and biases of the first and second layers may be permutated and scaled prior to every execution of the inference engine of the ML model.

In another embodiment, there is provided, a method for protecting a machine learning (ML) model from a side channel attack (SCA), the method executed by a processor in a data processing system, the method including: generating a random permutation of weights and biases for a first layer of the ML model; randomly scaling the permutated weights and biases of the first layer using a scaling factor greater than zero to generate scaled and permutated weights and biases for a first plurality of nodes of the first layer; modifying the weights of a second layer immediately following the first layer, wherein the weights of the second layer are modified to compensate for the permutation and scaling of the weights and biases of the first layer; and executing an inference engine for an inference operation of the ML model using the scaled and permutated weights and biases of the first layer and the modified weights of the second layer. The first layer may be a first layer of a neural network of the ML model and the second layer may be a second layer of the neural network immediately following the first layer. Executing the inference engine of the ML model may further include, for a node of the first layer, computing a first weighted sum for every output value of the node of the first layer using the permutated and scaled weight corresponding to the node of the first layer with an input value to the first layer to which the permutated and scaled biases are added. The method may further include applying an activation function to the scaled and permutated weights and biases of the first layer, and to the modified weights of the second layer. The activation function may be a rectified linear unit (RELU) activation function. The method may be performed or controlled using application programming interface (API) code in an application of the data processing system. The input may be an image to be classified by the ML model. The weights and biases of the first and second layers may be randomly permutated and randomly scaled prior to every execution of the inference engine of the ML model. The weights and biases of the first layer and the weights of the second layer may be randomly permutated and randomly scaled prior to a predetermined number of executions of the inference engine, wherein the predetermined number is less than every execution of the inference engine. The method may be implemented in a computer program comprising instructions stored in a non-transitory medium for execution by the processor of the data processing system.

FIG. 1 illustrates a simplified system 10 for training an ML model and then using the ML model in an inference operation. System 10 includes a labeled set of ML training data 12, model training block 14, and resulting trained ML model 16. In one embodiment, ML model 16 is implemented as a computer program including executable instructions stored on a non-transitory medium. In one example embodiment, ML model 16 includes an artificial neural network (NN) algorithm used to classify images. Trained ML model 16 may be loaded onto an integrated circuit device and used to recognize, for example, road signs in an automotive application. In other embodiments, ML model 16 may be different.

in accordance with an embodiment, trained ML model 16 may be a network including convolutional layers, fully connected layers, or other types of layers. Generally, a NN includes one or more input layers, one or more output layers, and one or more intermediate layers between the input and output layers. Each layer can have any number of nodes, or neurons. Typically, each of the nodes includes an activation function. There can be any number of intermediate layers. Each intermediate layer can include any number of nodes and concludes with a last hidden or last intermediate layer before one or more output layers. There can be any number of output nodes in the output layers. Typically, the number of output nodes is equal to the number of classes in a NN used for classification. Neural networks may also be used for other applications, such as object detectors.

Figure 2:
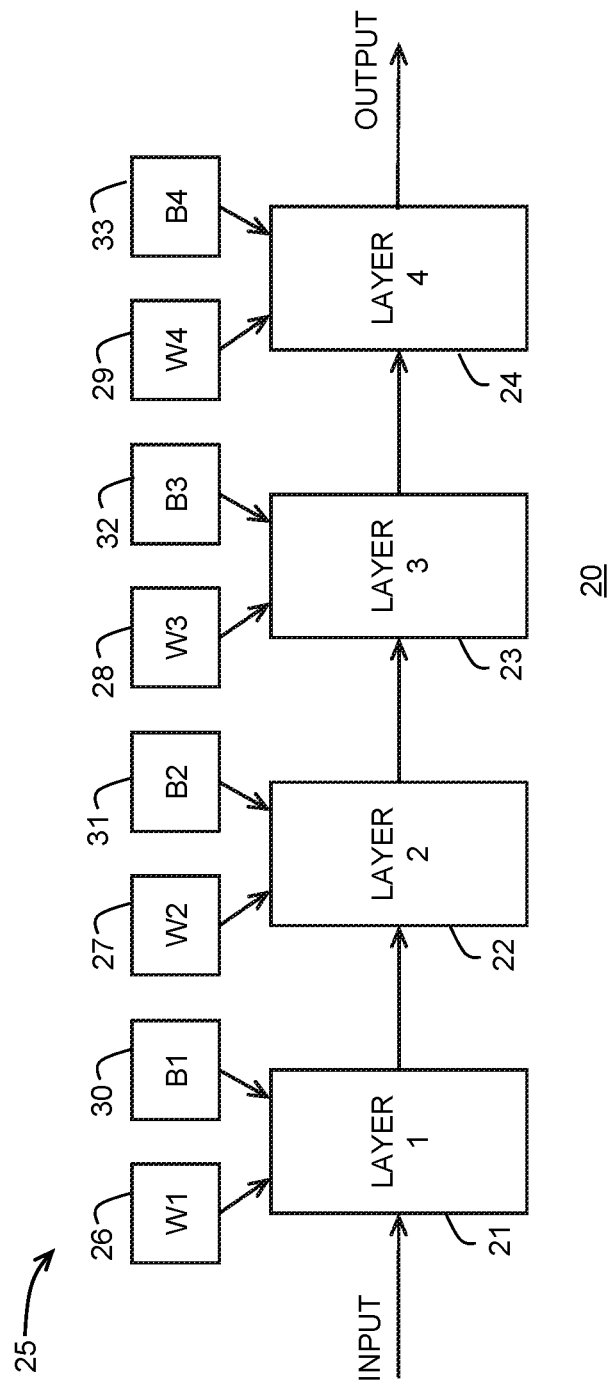
FIG. 2 illustrates an embodiment of a ML network for use in an ML model.

FIG. 2 illustrates a simple representation of a neural network 20 for use in an ML model 16. Machine learning network 20 includes a plurality of layers, each layer including a plurality of nodes. As an example, neural network 20 includes 4 layers 21-24 labeled "LAYER 1" through "LAYER 4". Other embodiments may have a different number of layers and each layer may have a different number of nodes. Input samples labeled "INPUT" are provided to input layer 21. Neural network 20 uses a plurality of weights and biases 25 which are generally stored separately in a memory. Each of layers 21-24 receives its own portion of the plurality of weights and biases. For example, layer 21 receives a plurality of weights 26 labeled "W1" and a plurality of biases 30 labeled "B1". Layer 22 receives a plurality of weights 27 labeled "W2" and a plurality of biases 31 labeled "B2". Layer 23 receives a plurality of weights 28 labeled "W2" and a plurality of biases 32 labeled "B3". Layer 24 receives a plurality of weights 29 labeled "W4" and a plurality of biases 33 labeled "B4". For fully connected layers the weights are matrices, and the biases are vectors. An input sample labeled "INPUT", which may be, for example, an image, is provided to an input terminal at layer 21 (LAYER 1). An output labeled "OUTPUT" is provided from an output terminal at layer 24. In one embodiment, in a ML model used for classification, the output may be a classification of the input sample.

Figure 3:
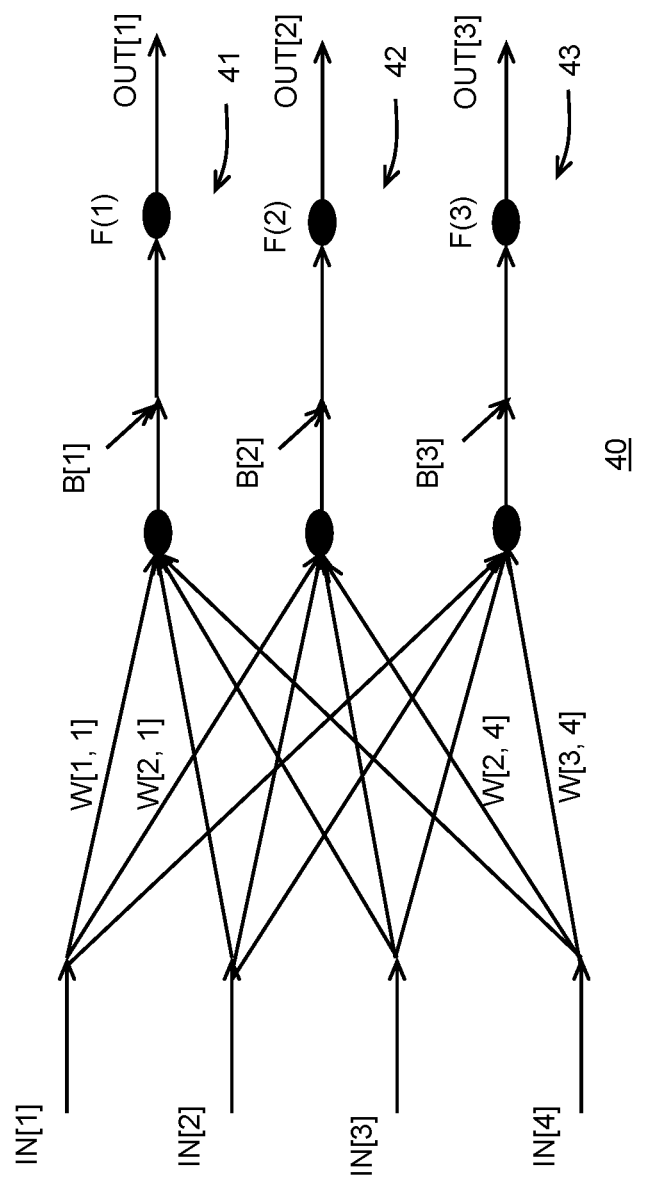
FIG. 3 illustrates a portion of an ML network.

FIG. 3 illustrates a layer 40 of a neural network of ML model nodes 41-43 of one layer. This layer has 4 input nodes (IN[1]-IN[4]), which is a vector of 4 elements, and 3 output nodes OUT[1]-OUT[4]) Each diagonal line corresponds to a connection between an Input node and an output node. A weight is assigned to each connection. Each weight is part of a weight matrix stored in memory. As part of the weighted sum computation, an input is multiplied with a weight. A weight of the multiplication (diagonal line) is represented by W[i,j], where i is an output index and runs from 1 to 3 in FIG. 3, and j is the input index and runs from 1 to 4. For example, weight W[1,1] is the weight between input IN[1] and output OUT[1]. Weight W[2,1] is connected between input node IN[1] and output node OUT[2]. The rest of the diagonal lines include similar weights but are not labeled. Note that realistic networks are deeper and often not a linear sequence of layers. In an inference operation, a weighted sum is computed for each node connection. A weighted sum computation is a basic calculation for a NN that includes a multiplication of weight W[i,j] of a connection between nodes with a value communicated over the connection. A bias value B[ ] may be added to the weighted sum computation. Typically, weights and biases are applied at each of the connections and nodes of the neural network. Generally, a weight W[i,j] at a node determines the sensitivity of input j on the output and bias B[ ] at a node delays a triggering of an activation function for each of the nodes. One or more output signals are computed based on the weighted sum of the inputs and outputs from the output nodes. An activation function F[ ] such as ReLU is applied to each of the weighted sum computations. The activation functions F[ ], the weights W[i,j], the biases B[ ], and the input IN[ ] to a node defines the output OUT[ ]. For fully connected layers, the input of the network, the output of the network, and the intermediate values are all vectors. An attacker that successfully extracts the weights and biases can recreate the NN.

Figure 4:
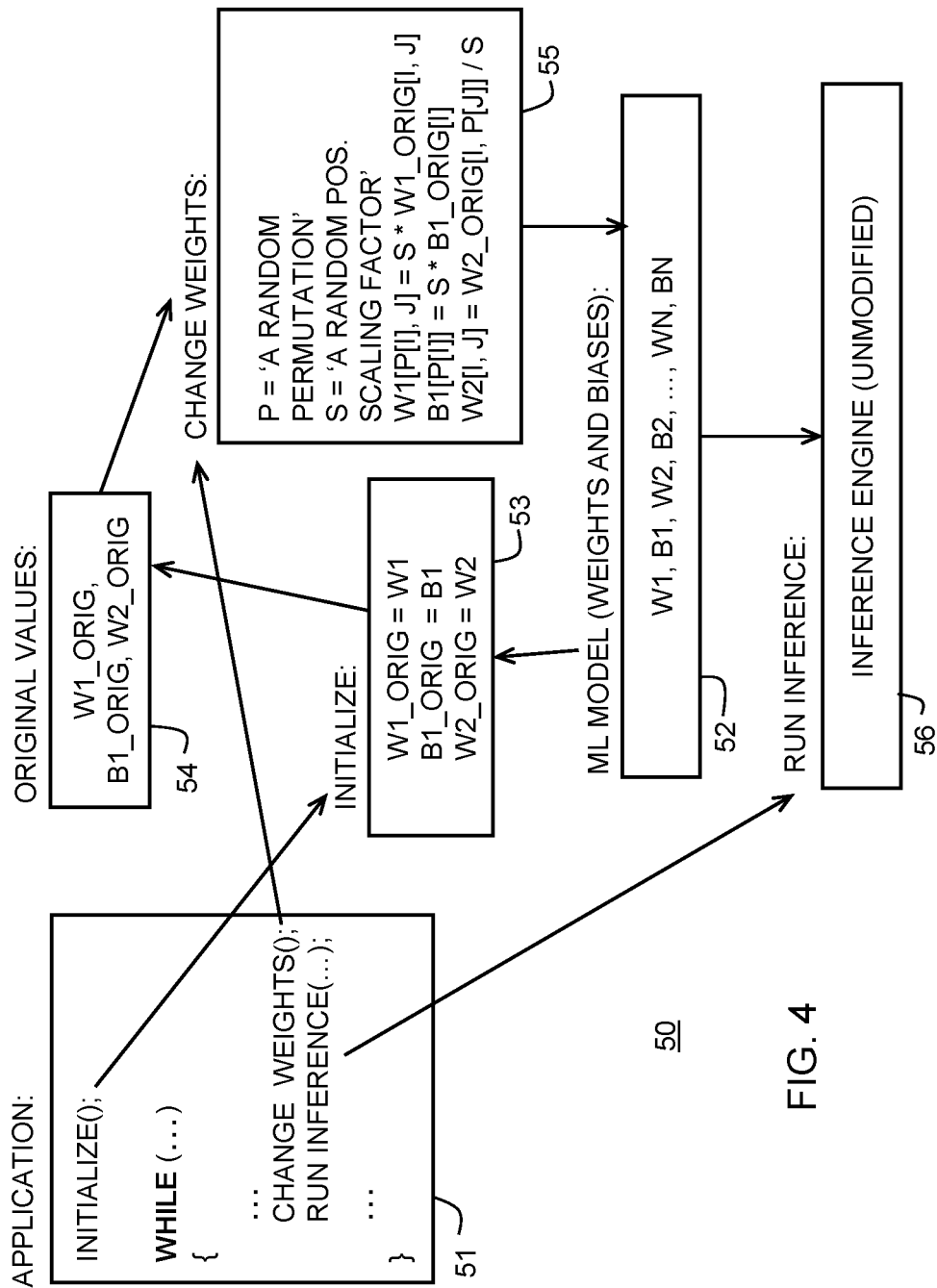
FIG. 4 illustrates an organization of a pseudo code for an SCA countermeasure in accordance with an embodiment.

FIG. 4 illustrates an organization of a pseudo code 50 in accordance with an embodiment. The objective of pseudo code 50 is to prevent an attacker from recovering the weights and biases used in a ML network, such as a neural network, by means of SCA. It is believed that protecting the first two layers of the NN is sufficient to protect the whole NN against SCA.

For simplicity, assume that the first two layers of the NN are fully connected layers. The fully connected layers may be convolutional layers which can be seen as a special case of fully connected layers where weights and biases are reused. One skilled in the art of neural networks would be able to apply pseudo code 50 to convolutional layers as well. Pseudo code 50 may be part of application 51 that is run on a data processing system to perform a function that includes use of a ML model. An example function may a function in an automobile that recognizes road signs and displays them for a driver of the automobile.

The following pseudo code describes a weighted sum computation for a fully connected layer implemented in the following algorithm that does not include SCA protection:

for i in 1 . . . n:

SUM=$B1[i]$ for j in 1 . . . m:

SUM=SUM+$W1[i,j]$*IN$[j]$

OUT1$[i]$=$F1$(SUM)

where i is an output index, j is the input index, and SUM is the weighted sum. Bias B1[i] refers to a single bias value in the first layer, and weight W1[i, j] refers to a single weight value as shown in FIG. 3.

A second fully connected layer following the first fully connected layer uses the output of the first layer OUT[1] in the following algorithm that does not include SCA protection:

for i in 1 . . . n:

SUM=$B2[i]$ for j in 1 . . . m:

SUM=SUM+$W2[i,j]$*OUT1$[j]$

OUT2$[i]$=$F2$(SUM)

For simplicity assume that the algorithms of the two layers have m inputs and n outputs, where m and n can be the same value. The code above shows that each layer computes for every output value OUT a weighted sum SUM of its input values IN to which a bias value B[ ] is added. A so-called activation function (F1 and F2 in the code above) is applied to the weighted sum value to produce one output value.

Application block 51 includes a SCA countermeasure code that modifies the weights and biases of the first two layers. Application block 51 may also include other code for providing a function. FIG. 4 shows a picture of organization 50 for providing the countermeasure. Application block 51 shows the application that first calls an "initialize" function that copies original weights and biases W1_ORIG, B1_ORIG, and W2_ORIG from ML model 52 that will be used to generate modified weights and biases W1, B1, and W2 as further described below. The original weights and biases W1_ORIG, B1_ORIG, and W2_ORIG are stored in a memory portion 54 of the data processing system. Next, application 51 calls inference engine 56 repeatedly, but before every inference run application 51 calls the "change weights" function which computes a new set of modified W1, B1, and W2 values based on the original values and random data. Before each inference run, weight values W1, B1, and W2 are re-initialized in block 53 with the corresponding original weights and biases from ML model 52 that were stored in memory portion 54 so that another modification can be performed by "change weights" block 55 with a different permutation and a different scaling factor. Below is the countermeasure code that performs the modification:

W1_ORIG=W1
B1_ORIG=B1
W2_ORIG=W2

Prior to execution of inference engine 56, W1, B1, and W2 are computed in block 55 from W1_ORIG, B1_ORIG, W2_ORIG as follows:

p='a random permutation'
s='a random positive scaling factor'

$W1[p[i],j]=s*W1\_ORIG[i,j]$ $B1[p[i]]=s*B1\_ORIG[i]$ $W2[i,j]=W2\_ORIG[i,p[j]]/s$

The above values for W1, B1, and W2 are substituted for the original weight and bias values in ML model 52. The "change weights" code block 55 provides random scaling and random permutation of the weights W1 and biases B1 of the first layer and therefore also random scaling and permutation of the output of the first layer. The weights W2 (and not the biases B2) of the second layer are computed by division by scale factor s such that weights W2 compensate for the modifications of weights and biases in the first layer. Note that the modification is to all of the nodes of the first and second layers. The results in OUT2 using the modified weights and biases are the same as would be computed without the countermeasure. Note that if weights W1 and biases B1 are randomly scaled and permuted with the same scaling and permutation parameters then OUT1 is also scaled and permutated. In the second layer computations, this will be compensated for by applying the inverse scaling and permutation on weights W2. After modified weights W2 have been applied, subsequent layers will receive weights and biases as if nothing had been modified. Therefore, it is not necessary to change biases B2. Inference engine 56 executes the code above to produce the weighted sums using the modified weights and biases. By constantly changing the weights and biases, a SCA is no longer effective because the values that are used by inference engine 56 are no longer constant from one inference execution to the next. Notice that an attacker cannot attack the code where W1, B1, and W2 are computed from W1_ORIG, B1_ORIG, and W2_ORIG because W1_ORIG, B1_ORIG, and W2_ORIG are not combined with a value that is under control of the attacker, which is a requirement for, e.g., differential power analysis (DPA) and correlation power analysis (CPA) types of SCA.

For correctness of the proposed transformation on the weights and biases, the activation function, such as activation function F(1), of the first layer should be made transparent for a positive scaling factor s. This means:

$s*F1(x)=f1(s*x)$ for all $x$ and all $s>0$.

This holds for the most frequently used ReLU activation function:

$ReLU(x)$=if $x$>0 then $x$ else 0

Generally, unmodified code is vulnerable to SCA because the power consumption (or electromagnetic emission) of the multiplication can be measured and can be correlated to a simulated power consumption of the known input and a guessed weight. This is done for all possible guesses and the one that gives the highest correlation is likely to be the correct guess and corresponds with the weight that has been used in the computation. Besides attacking the computation via SCA at the point of the multiplication, it is also possible to attack it later in the weighted sum computation. When the first two layers are protected against SCA as explained above, the attacker can no longer control the inputs of the third layer and therefore it is believed that SCA on the third and successive layers would be impossible, or at least very difficult.

One advantage of the presented SCA countermeasure is that it is not necessary to modify the inference engine because only weights and biases are changed. Modifying the inference engine is often a concern due to engineering, verification, maintenance reasons. Sometimes modifying the inference engine is simply not allowed due to licensing or contract restrictions.

There are also some disadvantages. First, the restriction that the activation function ReLU be used in the first layer may be a disadvantage, although most current neural networks use the ReLU activation function. A second disadvantage is that due to scaling, the dynamic range of the weights, biases, and activation function values increase. Therefore, the bit width of the values used in these layers should be increased or a floating-point representation should be used. This makes these layers slower, and they need more memory. A third disadvantage is that some inference engines are highly optimized and perform pre-processing on weights when a neural network is executed for the first time. These optimized inference engines cannot handle modifications of the weights after the first execution unless they are modified. The inventors tested inference engines TensorFlow Lite, TensorFlow Lite for Microcontrollers, and Glow, and for these inference engines the SCA countermeasure works, or the inference engines can be configured such that the countermeasure works.

In another embodiment, instead of applying the SCA countermeasure on the first two layers of the neural network, the countermeasure can be applied on two successive layers later in the neural network. This may reduce the performance impact, with the drawback that the earlier layers in the neural network are not protected. Although the inventors are not aware of attacks from the last layers of the neural network towards the earlier layers it may be helpful to protect the last two or more layers as well with the described countermeasure in case such an attack may turn out to be feasible.

In another embodiment, instead of modifying the weights and biases of the first two layers on every inference run, doing it less frequently may reduce the performance impact. For example, modifying the weights and biases on every nth execution of the neural network, where every group of n successive runs has the same weights and biases, and where n is greater than 1.

Figure 5:
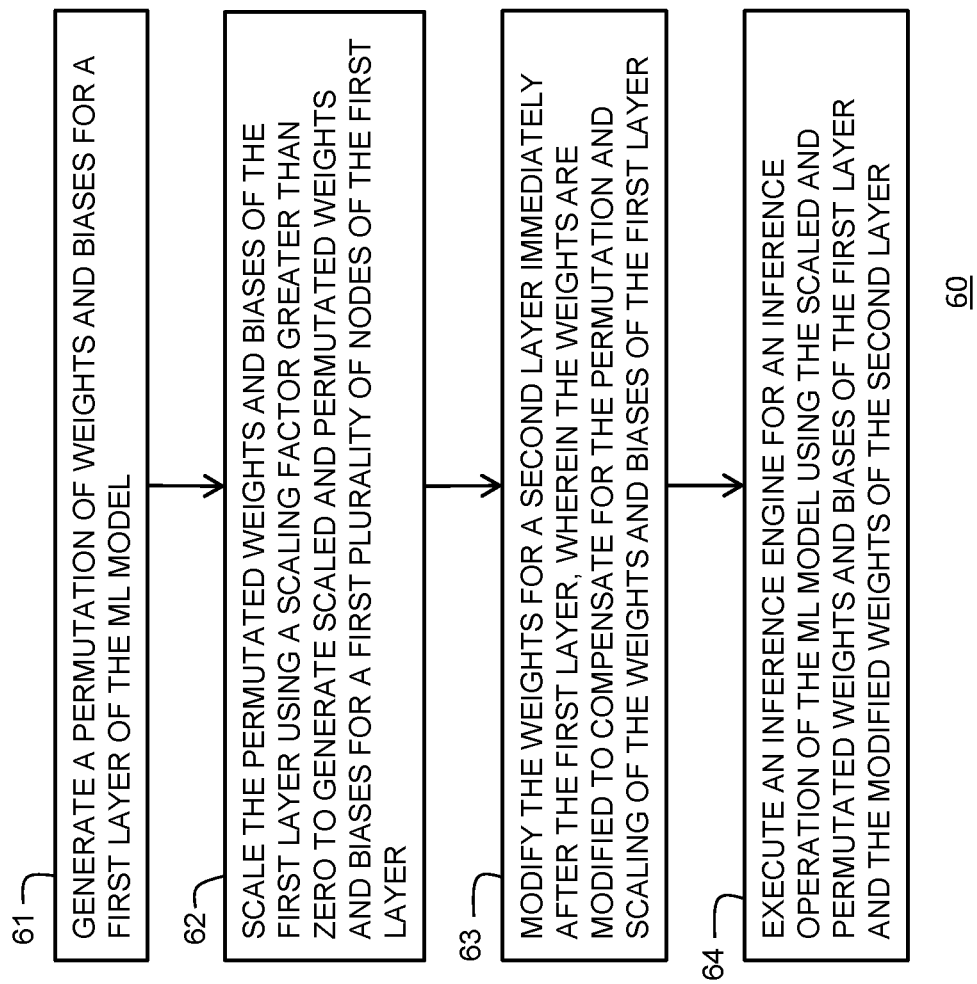
FIG. 5 illustrates a method for protecting a ML model from an SCA in accordance with an embodiment.

FIG. 5 illustrates method 60 for protecting a ML model from a SCA in accordance with an embodiment. Method 60 begins at block 61. At block 61, weights and biases for a first layer of the ML model are permutated. The first layer can be any layer of the ML model. In one embodiment, the first layer is the first layer of the ML model having weights and biases. Also, in one embodiment, the permutation is a random permutation. At block 62, the permutated weights and biases of the first layer are scaled using a scaling factor to generate scaled and permutated weights and biases of the first layer. In one embodiment, the scaling factor is randomly selected and is a positive value greater than zero. At block 63, the weights of a second layer immediately after the first layer are modified to compensate for the permutation and scaling of the weights and biases of the first layer. At block 64, an inference engine, such as in a neural network, is run for an inference operation of the ML model using the modified weights and biases of the first and second layers. Method 60 may be performed prior to each time an inference engine of the ML model is run, or every nth time the inference engine is run.

Figure 6:
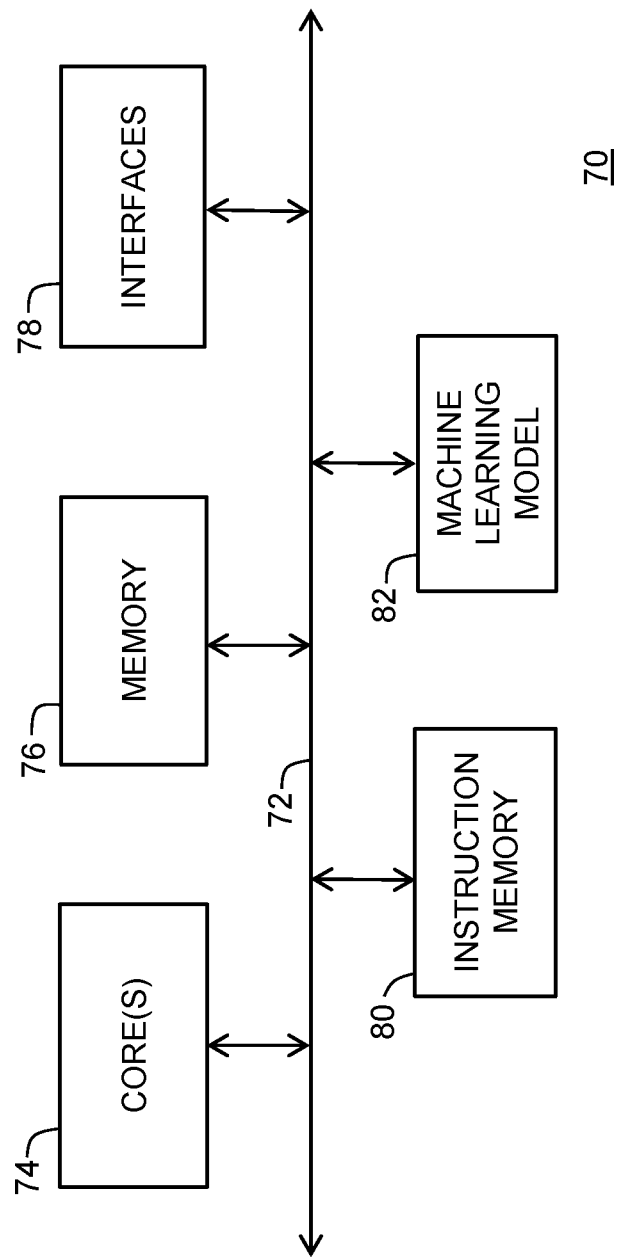
FIG. 6 illustrates a processor useful for implementing the SCA countermeasure of FIG. 4 in accordance with an embodiment.

FIG. 6 illustrates data processing system 70 for use in implementing the described method for protecting an ML model in accordance with an embodiment. Data processing system 70 may be implemented on one or more integrated circuits. Data processing system 70 includes bus 72. In other embodiments. bus 72 may be a switching network or other form of interconnection for communication between modules. Connected to bus 72 is one or more processor cores 74, memory 76, interfaces 78, instruction memory 80, and ML model 82. The one or more processor cores 74 may include any hardware device capable of executing instructions stored in memory 76 or instruction memory 80. For example, processor cores 74 may execute the ML algorithms used for training and operating ML model 82 and for modifying the weights and biases of the first and second layers according the disclosed embodiments. Processor cores 74 may be, for example, a microprocessor, field programmable gate array (FPGA), application-specific integrated circuit (ASIC), or similar device. Processor cores 74 may be implemented in a secure hardware element and may be tamper resistant.

Memory 76 may be any kind of memory, such as for example, L1, L2, or L3 cache or system memory. Memory 76 may include volatile memory such as static random-access memory (SRAM) or dynamic RAM (DRAM), or may include non-volatile memory such as flash memory, read only memory (ROM), or other volatile or non-volatile memory. Also, memory 76 may be implemented in a secure hardware element. Alternately, memory 76 may be a hard drive implemented externally to data processing system 70. Memory 76 may be a secure memory and may be used to store the ML model, to store the weights and biases for the ML model, and to store the modified weights and biases of the first and second layers for the SCA countermeasure as taught herein.

Interfaces 78 may be connected to one or more devices for enabling communication with a user such as an administrator. For example, user interface 78 may be enabled for coupling to a display, a mouse, a keyboard, or other input/output device. Interfaces 78 may include one or more devices for enabling communication with other hardware devices. For example, interfaces 78 may include, or be coupled to, a network interface card (NIC) configured to communicate according to the Ethernet protocol. Also, interfaces 78 may implement a TCP/IP stack for communication according to the TCP/IP protocols. Also, interfaces 78 may include an application programming interface (API) for interfacing an application with another program, such as an operating system (OS) of data processing system 70. Data samples for classification by ML model 82 may be input via interfaces 78, or similar interfaces. Various other hardware or configurations for communicating are available.

Instruction memory 80 may include one or more machine-readable storage media for storing instructions for execution by processor cores 74. For example, instruction memory 80 may store application 51 for modifying the weights and biases as shown in FIG. 4. In other embodiments, both memories 76 and 80 may store data upon which processor cores 74 may operate. Memories 76 and 80 may also store, for example, encryption, decryption, and verification applications used to protect sensitive ML model 82. Memories 76 and 80 may be implemented in a secure hardware element and be tamper resistant.

Machine learning model 82 may include trained ML model 16 of FIG. 1 as modified with the described SCA countermeasure. Machine learning model 82 may run on one or more of processor cores 74 or run on its own co-processor (not shown). Also, in one embodiment, ML model 82 may be stored in its own dedicated secure storage of memory 76 or stored encrypted in an unsecure memory portion of memory 76.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, edge device in an internet of things (IOT) system, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for protecting a machine learning (ML) model from a side channel attack (SCA), the method executed by a processor in a data processing system, the method comprising:
   generating a permutation of weights and biases for a first layer of the ML model, wherein the weights are matrices and the biases are vectors, and wherein generating a permutation of weights and biases for a first layer of the ML model includes permuting elements in the matrices and permuting elements in the vectors;
   scaling the permutated weights and biases of the first layer using a scaling factor greater than zero to generate scaled and permutated weights and biases for a first plurality of nodes of the first layer;
   modifying the weights for a second layer immediately following the first layer, wherein the weights are modified to compensate for the permutation and scaling of the weights and biases of the first layer; and
   executing an inference engine for an inference operation of the ML model using the scaled and permutated weights and biases of the first layer and the modified weights of the second layer for the inference operation.

2. The method of claim 1, wherein the first layer is a first layer of a neural network of the ML model and the second layer is a second layer of the neural network immediately following the first layer.

3. The method of claim 1, wherein executing the inference engine of the ML model further comprises, for a node of the first layer, computing a first weighted sum for every output value of the node of the first layer using the permutated and scaled weight corresponding to the node of the first layer with an input value to the first layer to which the permutated and scaled biases are added.

4. The method of claim 1, further comprising applying an activation function to the scaled and permutated weights and biases of the first layer, and to the modified weights of the second layer.

5. The method of claim 4, wherein the activation function is a rectified linear unit (RELU) activation function.

6. The method of claim 1, wherein the method is performed or controlled using application programming interface (API) code in an application of the data processing system.

7. The method of claim 1, wherein the scaling factor is randomly generated.

8. The method of claim 1, wherein the permutation is a random permutation.

9. The method of claim 1, wherein the input is an image to be classified by the ML model.

10. The method of claim 1, wherein the weights and biases of the first and second layers are permutated and scaled prior to every execution of the inference engine of the ML model.

11. A method for protecting a machine learning (ML) model from a side channel attack (SCA), the method executed by a processor in a data processing system, the method comprising:
   generating a random permutation of weights and biases for a first layer of the ML model, wherein the weights are matrices and the biases are vectors, and wherein generating a random permutation of weights and biases for a first layer of the ML model includes permuting elements in the matrices and permuting elements in the vectors;
   randomly scaling the permutated weights and biases of the first layer using a scaling factor greater than zero to generate scaled and permutated weights and biases for a first plurality of nodes of the first layer;
   modifying the weights of a second layer immediately following the first layer, wherein the weights of the second layer are modified to compensate for the permutation and scaling of the weights and biases of the first layer; and
   executing an inference engine for an inference operation of the ML model using the scaled and permutated weights and biases of the first layer and the modified weights of the second layer.

12. The method of claim 11, wherein the first layer is a first layer of a neural network of the ML model and the second layer is a second layer of the neural network immediately following the first layer.

13. The method of claim 11, wherein executing the inference engine of the ML model further comprises, for a node of the first layer, computing a first weighted sum for every output value of the node of the first layer using the permutated and scaled weight corresponding to the node of the first layer with an input value to the first layer to which the permutated and scaled biases are added.

14. The method of claim 11, further comprising applying an activation function to the scaled and permutated weights and biases of the first layer, and to the modified weights of the second layer.

15. The method of claim 14, wherein the activation function is a rectified linear unit (RELU) activation function.

16. The method of claim 11, wherein the method is performed or controlled using application programming interface (API) code in an application of the data processing system.

17. The method of claim 1, wherein the input is an image to be classified by the ML model.

18. The method of claim 11, wherein the weights and biases of the first and second layers are randomly permutated and randomly scaled prior to every execution of the inference engine of the ML model.

19. The method of claim 11, wherein the weights and biases of the first layer and the weights of the second layer are randomly permutated and randomly scaled prior to a predetermined number of executions of the inference engine, wherein the predetermined number is less than every execution of the inference engine.

20. A method for protecting a machine learning (ML) model from a side channel attack (SCA), the method executed by a processor in a data processing system, the method comprising:

generating a random permutation of weights and biases for a first layer of the ML model;

randomly scaling the permutated weights and biases of the first layer using a scaling factor greater than zero to generate scaled and permutated weights and biases for a first plurality of nodes of the first layer;

modifying the weights of a second layer immediately following the first layer, wherein the weights of the second layer are modified to compensate for the permutation and scaling of the weights and biases of the first layer; and executing an inference engine for an inference operation of the ML model using the scaled and permutated weights and biases of the first layer and the modified weights of the second layer;

wherein the weights and biases of the first layer and the weights of the second layer are randomly permutated and randomly scaled prior to a predetermined number of executions of the inference engine, wherein the predetermined number is less than every execution of the inference engine.

* * * * *